Oct. 6, 1925.

1,556,364

J. C. SMITH

REENFORCED GLASS

Filed March 31, 1923

Inventor:
John C. Smith,
By Fisher, Fowle, Clapp & Soans
Attys.

Patented Oct. 6, 1925.

1,556,364

UNITED STATES PATENT OFFICE.

JOHN C. SMITH, OF CHICAGO, ILLINOIS, ASSIGNOR TO SOLAR ELECTRIC COMPANY, OF CHICAGO, ILLINOIS, A CORPORATION OF ILLINOIS.

REENFORCED GLASS.

Application filed March 31, 1923. Serial No. 629,067.

*To all whom it may concern:*

Be it known that I, JOHN C. SMITH, a citizen of the United States, residing at Chicago, in the county of Cook and State of Illinois, have invented certain new and useful Improvements in Reenforced Glass, of which the following is a specification.

My invention relates to the reenforcing of glass by embedding a reenforcing material therein and is particularly useful in making glass articles which on account of their shape, do not permit the use of reenforcing means such as have sometimes been used heretofore.

The principal objects of my invention are to provide an improved reenforcing for glass; to provide a reenforcing which is readily adaptable to substantially any shape in which the glass may be formed; to permit variations in the texture of the reenforcing; to provide a reenforcing which affords a unique and distinctive pattern; to arrange the reenforcing so that it may be substantially concealed in an article of opaque material; and in general, to provide an inexpensive reenforcing which may be conveniently applied in articles made of glass.

Figure 1:
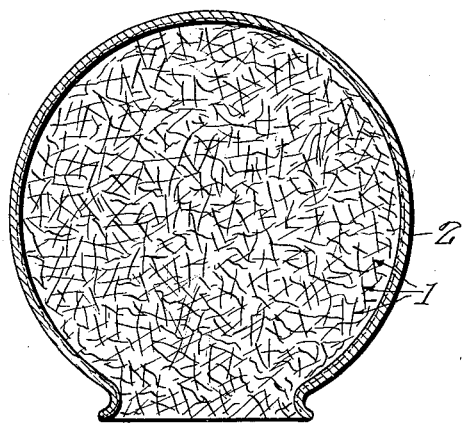
Figure 2:
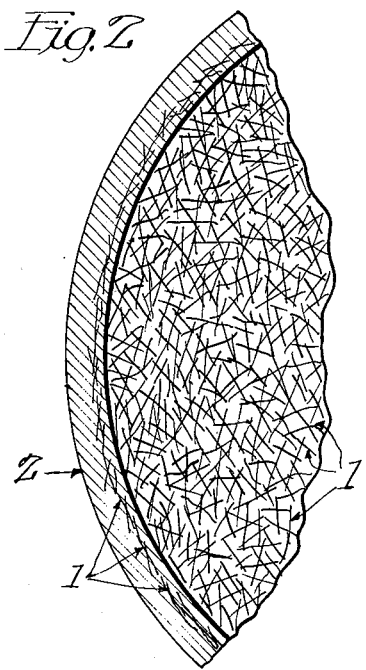

On the drawings which illustrate merely one of the many forms in which my invention may be used, Fig. 1 is a sectional view of a hollow glass ball, such as an electrical lamp shade, reenforced in accordance with my invention; and Fig. 2 an enlarged sectional view of a portion of the wall of the ball.

The reenforcing which I use consists of a network of separate filaments, such as fine wires, asbestos fibres or other suitable material which may be incorporated in the glass. These filaments are preferably quite short, particularly in cases where the glass is to be curved or irregular in form, as the short filaments readily adapt themselves to the various shapes of glass articles without bending. These filaments are uniformly distributed throughout the extent of the glass wall of the article in a more or less close arrangement, depending on the degree of reenforcing desired. It is preferred however that they be arranged sufficiently close so as to insure thorough overlapping or intersecting of adjoining wires so that a break in the glass at any point will necessarily intersect some of the reenforcing members, and these latter will therefore serve to limit the extent of the break and also hold the pieces together.

In practice I have found that short pieces of fine wire serve the purpose very satisfactorily, although other materials such as asbestos fibres may be used. When wires are used they are preferably made of a heat resisting alloy as copper or other materials which do not have this characteristic oxidize under heat.

In the drawings which illustrate the application of my invention to a glass ball of the type which is commonly used in lighting fixtures, the numeral 1 indicates the reenforcing which is composed of a large number of short lengths of fine wire or asbestos fibres which are molded in the glass wall 2 of the ball in a somewhat loosely matted relation so that the reenforcing members intersect one another to a greater or less extent, depending on the degree of reenforcing that is desired. The reenforcing may be incorporated in the glass in various ways, for example, in blown glass, by interposing a quantity of the reenforcing filaments between inner and outer layers of molten glass composing the gob which is blown into the desired shape, the filaments spreading out as the molten glass is shaped into the desired matted form and being consolidated in the glass as the latter cools.

The reenforcing may, if desired, be disposed between the inner and outer surfaces of the glass wall so that it is close to the inner surface as shown in Fig. 2, this arrangement of the reenforcing being particularly useful in articles made of an opaque material, as the location of the reenforcing material remote from the outer surface of the wall permits the reenforcing to be concealed owing to the opaque character and thickness of the wall at the outer side of the reenforcing.

While I have shown and described my invention in a preferred form, I am aware that various changes and modifications may be made without departing from the principles of my invention, the scope of which is to be determined by the appended claims.

I claim as my invention:

1. A reenforced glass having a plurality of separate filaments arranged in a haphazard manner and embedded in the glass.

2. A reenforced glass having a layer of loosely matted short filaments interposed between the inner and outer surfaces of the glass.

3. A reenforced glass having a plurality of short wires arranged in a haphazard manner and embedded in the glass in overlapping relation.

4. A reenforced glass having a network of reenforcing material embedded in the glass, said network being composed of a plurality of separate unconnected elements positioned in a haphazard manner to conform to the shape of the glass.

5. The combination of a glass wall having a plurality of separate short filaments embedded in a haphazard manner therein in overlapping relation, and forming substantially a layer of reenforcing between the inner and outer surfaces of the wall.

6. The combination with a hollow glass article of a reenforcing structure composed of unconnected filaments arranged in a haphazard manner and conforming to the shape of the article and embedded in the wall thereof.

JOHN C. SMITH.